June 12, 1934.   J. C. ALBRIGHT   1,962,676
CONTROL SYSTEM
Filed March 17, 1932   2 Sheets-Sheet 1

INVENTOR
Joseph C. Albright.
BY
Raymond W. Junkins
ATTORNEY

Patented June 12, 1934

1,962,676

UNITED STATES PATENT OFFICE 1,962,676

CONTROL SYSTEM

Joseph C. Albright, Teaneck, N. J., assignor to Bailey Meter Company, a corporation of Delaware Application March 17, 1932, Serial No. 599,565

5 Claims. (Cl. 137—164)

This invention relates to control systems and particularly to systems wherein hydraulic, electrical or other forces are utilized in the control of variables, and responsive to variations in the value or the relation of values of the same or other variables in the operation of apparatus. The variables which dictate the actuation of control, or which I control, may be physical, electrical, thermal, chemical, etc., and may be in the nature of rate, pressure, temperature or of similar characteristics.

Control systems are known wherein what I term as a positioning or geared control is utilized. A hydraulic pilot, for example, is positioned responsive to the value of a variable such as pressure of a fluid, for the positioning through hydraulic means of a valve controlling the fluid pressure; for every pressure there is a certain valve position, and the valve is said to be geared to the pressure. It is usual in this type of control to have a follow-up or tie-back from the valve to the pilot to shut off the flow of hydraulic fluid therethrough when the valve has reached the position corresponding to the pressure. The "breadth of regulation" or variation in pressure for full travel of the valve may be varied, and as it decreases the action approaches and on-off positioning of the valve.

Other control which I term floating control may be similar, to the extent that a pilot positioned responsive to the value of a variable, controls hydraulic fluid for actuation or positioning of a valve to control the variable, but the system is not provided with a follow-up or tie-back. The valve continues to be moved so long as the pilot is away from its shutoff position, and the pilot will remain away from its shutoff position until the positioning of the valve causes sufficient change in the pressure of the fluid to cause a return of the pilot to its original or shutoff position. Thus the pilot will have returned to its predetermined position, but the valve will be left in a new position, and the two not being geared together as in the first illustration, are said to be floating, the one relative to the other.

I have found that in certain types of control problems neither of these two systems alone will effect a satisfactory control, and it is therefore the primary object of my invention to so combine controls of positioning and floating types as to result in desired regulation or control.

Another object of my invention is to combine the positioning and floating type of control in series, one with the other.

A still further object is to have the value of the variable or relation of values of variables which I desire to maintain at or near the predetermined value, effect a control of a floating type which in turn actuates the positioning type of control for regulation of a variable whose regulation will tend to cause a change in the variable or relation of variables first mentioned.

Other objects will become apparent from the drawings and description thereof, as well as the claims appended hereto.

I have chosen as a preferred embodiment of my invention to illustrate and describe, a control system in connection with the regulation of the rate of supply of water fed to a steam generating boiler, and for desirably maintaining a substantially constant level of water within the steam boiler.

In the drawings: Fig. 1 is a somewhat diagrammatic showing of the steam separation drum of a boiler having water inflow and steam outflow conduits connected thereto, and to which is applied apparatus for controlling the water inflow.

Figure 1:
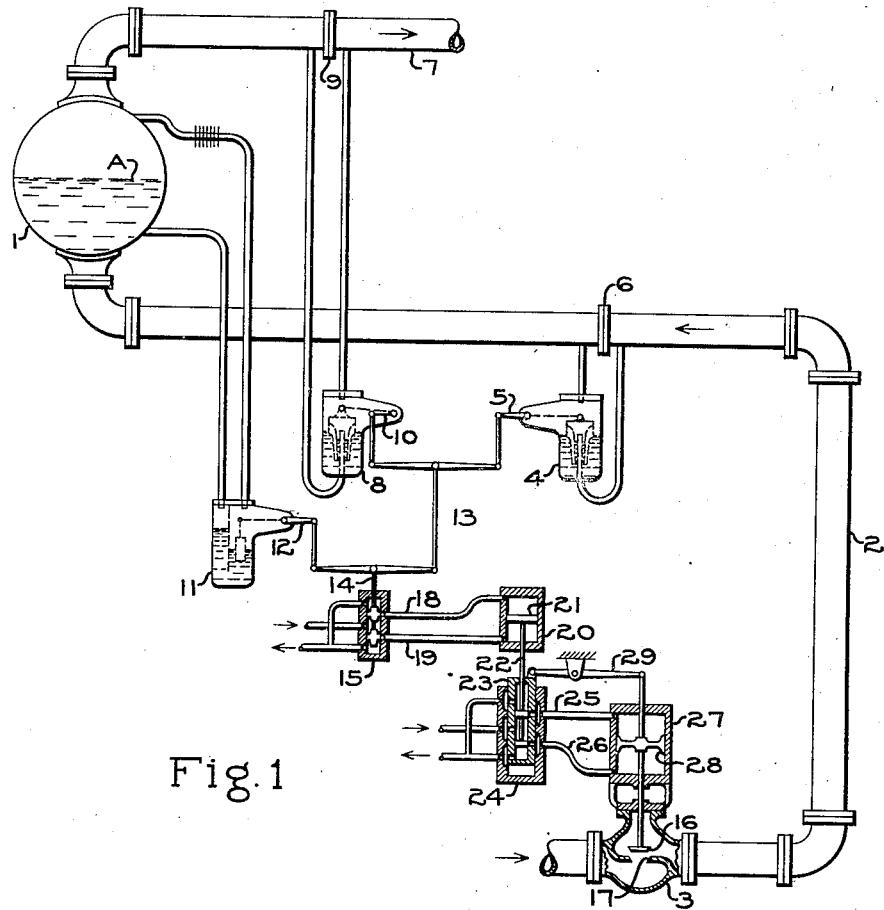

I illustrate at 1 the drum of a steam generating boiler wherein is desirably maintained a water level indicated at A. Water is fed to the boiler through a conduit 2 in amount controlled by the throttling condition of a regulating valve indicated generally at 3. The rate of flow of the water fed to the boiler is indicated by a flow meter 4, having an indicating arm 5 positioned angularly responsive to a pressure differential resulting from a change in volocity of the water flowing past an obstruction within the conduit 2. Such obstruction for creating a pressure differential bearing a known relation to the rate of flow may be an orifice, as is well known in the art, formed in a plate and held by the flanges 6. The flow meter 4 may be of the liquid-sealed bell type as illustrated and described in the patent to Ledoux No. 1,064,748. Such a meter is a differential pressure responsive device and adapted to correct the non-linear relation between differential pressure and rate of flow, to the end that angular positioning of the indicating arm 5 is by increments directly proportional to increments of rate of flow. I have illustrated by dotted lines within the flow meter 4 and within a similar meter 8 (later to be described), the outline and the internal construction of this type of meter, wherein the bell has walls of material thickness, and which construction is more fully illustrated and described in the above mentioned Ledoux patent.

Steam generated in the boiler, leaves the drum 1 through a conduit 7. A rate of flow meter 8, responsive to a pressure differential created by an orifice or similar device held by the flanges 9, positions an indicating arm 10 by increments directly proportional to increments of rate of flow and in a manner as just described relative to the flow meter 4.

Responsive to variations in the level A of the water within the boiler drum 1, I have shown a differential pressure responsive device 11, having a float riding on the surface of a fluid such as mercury in one leg of a U-tube in a well known manner to position an indicating arm 12 directly in accordance with changes in the level A. Through the linkage generally indicated at 13 I cause to be vertically positioned a pilot 14 relative to a co-operating pilot casing 15. The arrangement is such that the rate of water flow to the boiler is balanced against the rate of steam flow from the boiler, causing equal movements of the indicating arms 5 and 10 in opposite directions of rotation, with no resulting vertical motion of the pilot 14 if the water input is equal to steam output; but if for any reason such as leakage of water from the boiler drum, the level a does not remain constant or at a desirable predetermined line, then a movement of the indicating arm 12 will position the pilot 14 vertically.

Conversely, should the level A and the indicating arm 12 remain at their predetermined positions, but the rate of flow of water to the boiler be not equal to the rate of flow of steam from the boiler, the resulting motion through the linkage 13 will be a vertical positioning of the pilot 14. Such a condition is possible, due to a change in density of the water below the surface A or for other reasons. In any event, the arrangement is such that the rate of steam flow is balanced against the rate of water flow, and a predetermined water flow desirably maintained, and when such relations are departed from the pilot 14 is positioned vertically.

The vertical positioning of the pilot 14 from predetermined and desirable position indirectly causes a positioning of a valve 16 relative to its seat 17 in the regulating valve 3 for control of water fed to the boiler through the conduit 2. It is a principal object of the present invention to provide in desirable arrangement certain devices or means between the pilot 14 and the valve 16 whereby upon departure of the pilot 14 from a predetermined position a desirable regulation of the valve 16 relative to its seat 17 is accomplished.

Hydraulic fluid under pressure from any desired source (not shown) is available at the pilot casing 15 and the casing 15 is further provided with leakage or drain-off pipes. The pilot casing 15 is connected by pipes 18, 19 with a cylinder 20, above and below respectively a piston 21 adapted to be positioned axially in the cylinder 20 through application of hydraulic fluid under pressure to the opposite sides of the piston.

In the casing 15 opposite the joining points of the pipes 18 and 19 are ports through which hydraulic fluid from the interior of the casing 15 may pass to the pipes 18 and 19 when the pilot 14 is moved out of alignment with the ports vertically upwardly or downwardly from a predetermined shutoff position. For example, as shown in the drawings, the lands of the pilot 14 are in shutoff position with the ports. If the pilot 14 is moved downwardly, fluid pressure from within the casing is admitted to the pipe 19 below the piston 21, while hydraulic fluid from above the piston 21 may pass through the pipe 18 and its corresponding port to one of the leakage or drain-off pipes of the casing 15.

Such an arrangement per se constitutes what I have termed a floating control, wherein desirably the pilot 14 is always returned to a predetermined position when the inter-relation of water input, steam output and water level is in desired relation regardless of value, and so long as the pilot 14 is away from its predetermined position the piston 21 will continue in its movement, there being no follow-up or tie-back between the piston position and the pilot position mechanically or through hydraulic reaction.

Figure 2:
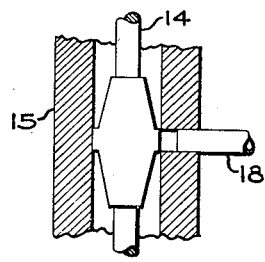
Fig. 2 is an enlarged view of a pilot.

I preferably form the pilot 14 as disclosed in the co-pending application of James M. Wilson, Serial No. 515,276 filed February 12, 1931 and illustrated to larger scale in Fig. 2. Herein the parts of the pilot beyond the shutoff or land portions are tapered by the removal of inclined segments or parts so that the rate of motion of the piston 21 in the cylinder 20 is dependent upon the amount of movement of the pilot 14 in either direction from predetermined position, and of course its total motion within the cylinder 20 is dependent upon the length of time during which the pilot 14 is away from its predetermined position.

I have found that if I were to position the valve 16 directly from the piston 21, I would obtain quite erratic results. For instance, valve stem reaction, friction of the piston, stuffing gland friction, etc. as well as leakage of fluid past the piston, predetermine a certain fairly considerable movement of the pilot 14 from the predetermined position before sufficient transfer of hydraulic fluid from the casing 15 to the cylinder 20 at opposite sides of the piston 21 would be accomplished to overcome friction or other resistance to motion and then the valve 16 would tend to move more rapidly than the small departure of the pilot 14 from its predetermined position had dictated, and the movement would be in an erratic or jumpy manner as resistance was successively encountered and overcome. Furthermore, that even though the pilot 14 were an appreciable distance away from its predetermined position, the motion of the valve 16 would be erratic and at an unpredictable speed, and at speeds not uniform for different positions of the piston 21 within the cylinder 20. The feed water pressure at the valve 3 may vary as much as 50 pounds with corresponding variation in stem reaction, and forms one of the biggest possible variables in the smooth positioning of the valve 16.

I have found that I may overcome the difficulties mentioned and obtain an improved control through the interpositioning between the piston 21 and the valve 16 of a positioning type of control. I show a second pilot 22 carried with and positioned by the piston 21 relative to a pilot casing 23 which itself is axially positionable in a fixed outer casing 24. The outer casing 24 is connected by pipes 25, 26 to the cylinder 27 above and below, respectively, the piston 28 which is fastened to and carries with it the valve 16. Hydraulic fluid pressure supply pipe and drainoff pipes join the casing 24 in a manner similar to the pilot casing 15 and ports through the casing 23 allow the fluid supply to enter the interior of the casing, and from which ports communicate with the pipes 25, 26; such ports normally shut off by the lands of the pilot 22.

A lever 29 fulcrumed intermediate its ends is pivotally joined at one end to an extension of the piston 28 and at the other end to the pilot casing 23, whereby upward movement of the piston 28 results in proportional downward movement of the pilot casing 23 and vice versa.

The pilot 22, piston 28 and related parts constitute a positioning type of control with follow-up through the lever 29. When the pilot 22 is positioned downwardly, for example, until its lands are out of alignment with the ports in the casing 23, hydraulic fluid under pressure within the casing 23 between the lands of the pilot is available through the pipe 26 to the under side of the piston 28 for upward movement thereof. Such upward movement tends to oscillate the lever 29 around its pivot in a counter-clockwise direction whereby the pilot sleeve 23 is moved downwardly until its ports are in shut-off position opposite the lands of the pilot 22 and no further movement of the piston 28 is allowed until the pilot 22 is again moved in one direction or the other. Thus there is a definite position of the piston 28 for each position of the pilot 22, and the two are in effect geared together.

In operation of the complete system; if steam outflow increases, or if water level A decreases, thereby in either event indicating a demand for an increase in the rate of water flow to the boiler, the pilot 14 is positioned upwardly from predetermined position. The amount of its upward positioning is representative of the desired rate of change of water feed, for the rate of change of water feed should be slower if the departure is a small amount from predetermined position than if it is a large amount from predetermined position. The effect, such as speed of the piston 21, produced by a positioning of the pilot 14, will be representative of the desired rate of change of water feed. The pilot 22, however, being of a sharp cutoff type, will allow substantially full hydraulic fluid pressure to one side or the other of the piston 28 immediately the pilot is moved out of alignment with the ports in the casing 23, and thus the speed of positioning of the piston 28 is substantially uniform regardless of its position in the cylinder 27 or of the amount of movement of pilot 22 from alignment with its related ports.

As soon as the piston 21 begins to move, then the pilot 22 is moved from alignment with the ports in the casing 23, and immediately the piston 28 begins to move and at a substantially uniform speed regardless of the speed effect of the piston 21. The follow-up system comprising lever 29 determines a definite position of the piston 28 as soon as the piston 21 stops moving, but if the piston continues to move at a constant speed then the piston 28 will move at a constant speed, lagging by a certain amount. A rubber band action is attained between movement of the piston 21 and movement of the piston 28, and the stretch of the rubber band is actually the difference in speed of the pistons.

The speed of movement of the valve 16 and its piston 28 is representative of the actual rate of change of the water flow, assuming that the valve characteristic is substantially uniform, which of course is possible of arrangement.

Thus I may control the water feed to the boiler to vary or control water level in the boiler through obtaining an effect, such as speed of the piston 21, representative of the desired rate of change of water feed and further obtaining an effect, such as speed of the piston 28, representative of the actual rate of change of the water feed, and then vary the actual rate of change in accordance with the difference in the speed of the pistons. This will be apparent when it is realized that the speed of pilot 22 and speed of travel of the casing 23 are always attempting to be the same, for the casing 23 is always following up movement of the pilot 22 in an endeavor to shut off the port openings.

Any resistance to movement of the piston 28 such as friction or leakage past the piston will result in a greater lag of the casing 23 relative to the pilot 22 and correspondingly a greater port opening whereby a larger volume of substantially constant pressure hydraulic fluid will be admitted to the piston 28, thus causing it to hurry up or change its speed. Thus a difference between the speed of piston 21 and the speed of piston 28 will cause a change in the speed of the piston 28 until the two move substantially in synchronism.

In general, the overall operation is a floating type of control in which the valve 16 does not take up a position directly related to the pilot 14, but is moved at practically a full, constant force relayed or amplified over the force of the original pilot control and to overcome any resistance or leakage and thereby move positively.

It will readily be seen that the arrangement I have illustrated and described need not necessarily be limited to hydraulic operation, but may be embodied in electrical or other type of control systems. Furthermore, it is not necessarily applied to the control of the supply of water to a vapor-generator from the inter-relation of steam outflow, water inflow and water level, nor is it necessarily only applicable to the control of the supply of water to a boiler regardless of what variable might represent a need for water in the boiler. It is my conception that the system may have numerous applications responsive to variables in the operation of different apparatus and for the controlling of the same or other variables.

Certain specific arrangements or embodiments of my invention are disclosed and claimed in the co-pending applications Serial No. 551,215 filed July 16, 1931 by Paul S. Dickey and Serial No. 536,046 filed May 8, 1931 by Clarence Johnson.

Figure 3:
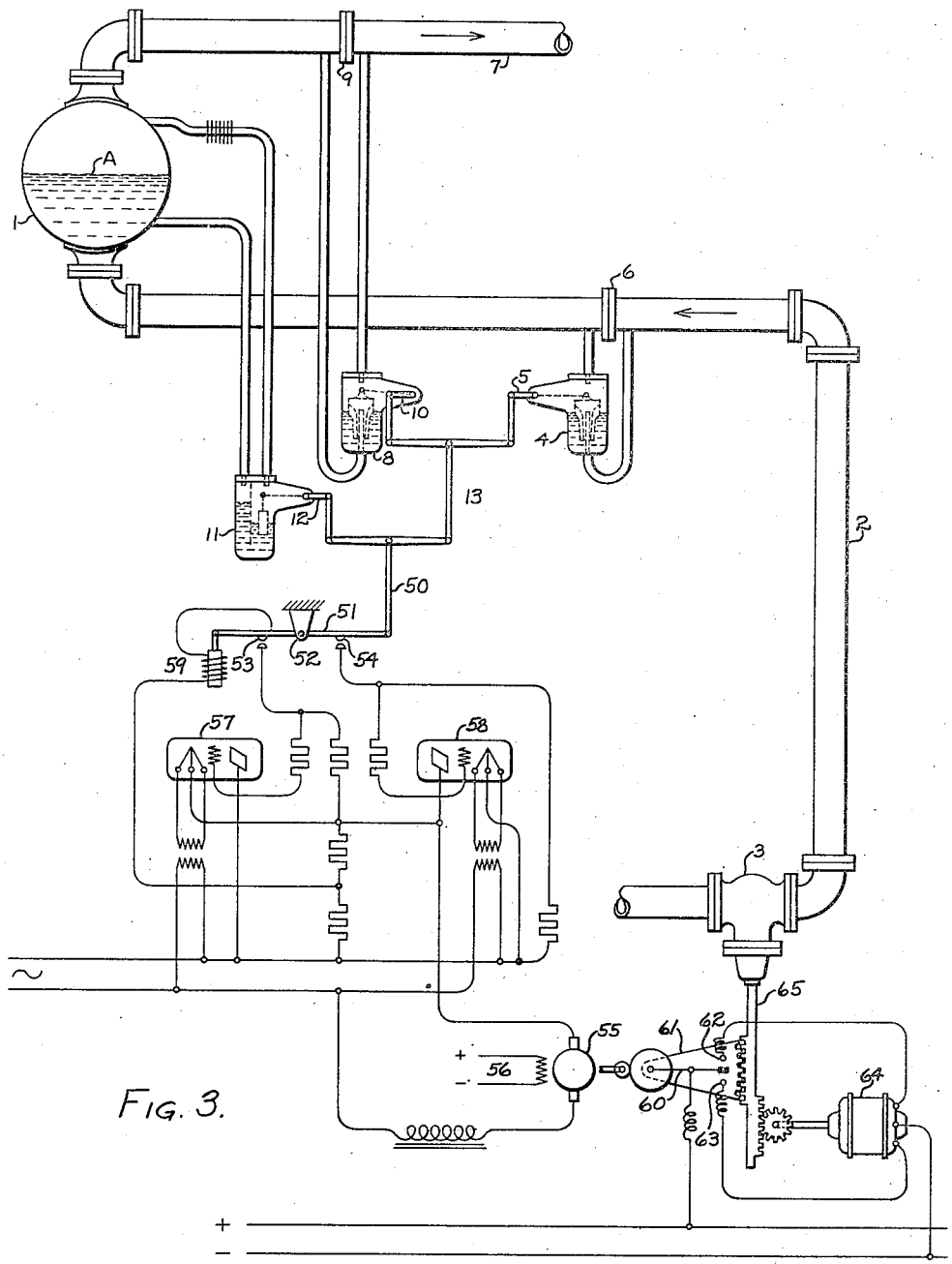
Fig. 3 is similar to Fig. 1 but utilizes electric means instead of hydraulic means as an embodiment of the invention.

In Fig. 3 I illustrate a further embodiment of my invention similar to that shown in Fig. 1 and which I have described in detail, except that in Fig. 3 I employ electric means rather than hydraulic means. The linkage generally indicated at 13 vertically positions rod 50 angularly moving a contact bar 51 around a pivot 52. The contact bar carries one-half of a pair of contacts 53 and one-half of a pair of contacts 54. The contact arm 51 in general serves the purpose of controlling the rotation and speed of the motor armature 55 having a direct current energized field 56; the armature 55 being connected in an alternating-current circuit. Movement of the contact bar 51 from a non-contacting position results in the armature moving from a position of rest in one direction or the other at a speed with the extent of angular motion of the arm 51, and therefore in direction and at a speed dependent upon the vertical positioning of the rod 50.

In the armature circuit I provide two oppositely connected three-element electronic devices, such, for example, as thermionic valves 57 and 58, each having a control grid wherein if the grid voltage is of proper value, the valve conducts or passes current in one direction.

Thus, with alternating current voltage applied, the output of the valve is in each case half wave pulsating direct-current, and with the valves oppositely connected, one-half of the alternating current wave passes through one of the valves in a given direction, while the other half of the alternating current wave passes through the other valve in the opposite direction. Thus, with the two valves oppositely connected in parallel with each other and, in turn, in series with the armature across the source of alternating-current, if contact 53 is close-circuited, the valve 57 will pass current, allowing pulsating direct-current in a given direction to pass through the armature 55 and cause rotation thereof in desired direction. Conversely, if the contacts 54 are close-circuited, then the valve 58 allows passage of current for rotation of the armature 55 in the opposite direction. An inductance 59 is effective regardless of which valve is conducting, to the end that speed of rotation of the armature 55 is dependent upon amount of angular positioning of the contact arm 51 from its neutral or non-contacting position.

The resultant action of the means so far described is that the armature 55 will rotate in desired direction and desired speed, dependent upon departure of the inter-relation between steam flow, water flow and water level as indicated by vertical positioning of the rod 50. The further the inter-relation departs from the desired inter-relation, the greater speed of rotation will be accomplished by the armature 55.

The armature 55 operates through gearing to angularly position a contact arm 60 relative to a segment 61, pivoted for rotation around the same center as the contact arm 60 and carrying two contacts 62, 63 adapted to cooperate with the contact arm 60. In other words, assuming the contact segment 61 to be in a stationary position, then clockwise rotation of the contact arm 60 will cause an engagement of such contact arm with the contact 63, while rotation in a counter clockwise direction will cause its engagement with a contact 62. Engagement with either the contact 62 or the contact 63 completes circuit for rotation of a constant speed motor 64 in one direction or the other, for positioning the stem 65 of the valve 3.

The operation is such that departure of inter-relation of steam flow, water flow and water level causes an engagement of the contact 53 or the contact 54 for rotation of the armature 55 in one direction or the other and at a speed varying with the amount of departure of the inter-relation of variables. Rotation of the armature 55 then causes a close-circuiting of the contact 62 or contact 63, for a rotation of the motor 64 at constant speed but in proper direction for movement of the regulating valve 3. Here again, as in Fig. 1, is a combination of floating control in series with positioning or geared type of control. This embodiment serves the purpose only of illustrating how my preferred series combination of floating and positioning control may be embodied in electrical actuating means as well as in hydraulic actuating means. It might equally as well be applied to control of pressure, or temperature, or any desired variable, as to the control of feed water supply to a boiler from steam flow, water flow and water level.

Having now described a preferred embodiment of my invention I desire it to be understood that I am not to be limited thereby except as to the claims in view of prior art.

What I claim as new and desire to secure by Letters Patent of the United States, is:

1. The method of maintaining a desired ratio between the rates of flow of two fluids, which includes, producing an effect representative of the difference between the actual and desired ratios and changing the rate of flow of one of the fluids at a rate in accordance with said difference by obtaining from said effect an effect representative of the desired rate of change, producing an effect representative of the actual rate of change in the rate of flow of the said one of said fluids, and varying the actual rate obtained to the rate of flow in accordance with the difference in the two last-named effects.

2. In a control system for regulating the application of a corrective agent to maintain a variable at a predetermined value, in combination, a source of power, a movable member, means for producing a motion of said member by said power at a rate proportional to the magnitude of said variable, a second source of power, a regulator for controlling the application of the corrective agent actuated by said second power, a second movable member actuated by said regulator, and means under the joint control of said movable members for controlling the application of said second power to said regulator.

3. In a control system for varying the rate of change in the application of a corrective agent in proportion to the magnitude of a variable to maintain the variable at a predetermined value, in combination, a source of power, a movable member, means for producing a motion of said member at a rate proportional to the desired rate of change in the corrective agent, a regulator, a second movable member, means for producing a motion of said second member at a rate proportional to the actuation of said regulator by said power, and means under the joint control of said members for controlling the application of said power to said regulator.

4. In a control system for varying the rate of change in the application of a corrective agent in proportion to the magnitude of a variable to maintain the variable at a predetermined value, in combination, a source of pressure fluid, a movable member, means for producing a motion of said member at a rate proportional to the desired rate of change in the corrective agent actuated by said pressure fluid, a regulator, a second movable member, means for producing a motion of said second member at a rate proportional to the actuation of said regulator by a second fluid pressure, and means under the joint control of said members for controlling the application of said second fluid pressure to said regulator.

5. The method of producing a desired rate of change in the rate of flow of a fluid for maintaining a desired ratio between the rate of flow of the fluid and an undetermined rate of flow of a second fluid, which includes, producing an effect representative of the desired rate of change in the rate of flow of the first fluid, producing an effect representative of the actual rate of change in the rate of flow of the first fluid, and varying the actual rate of flow of the first fluid at a rate in accordance with the difference in said effects.

JOSEPH C. ALBRIGHT.